(12) United States Patent
Zhong et al.

(10) Patent No.: US 9,768,614 B2
(45) Date of Patent: Sep. 19, 2017

(54) OPTIMAL CONTROL METHOD AND APPARATUS FOR POWER SYSTEM FREQUENCY AND RESERVE REGULATION WITH ASYMMETRIC INFORMATION

(71) Applicant: Tsinghua University, Beijing (CN)

(72) Inventors: Haiwang Zhong, Beijing (CN); Qing Xia, Beijing (CN); Chongqing Kang, Beijing (CN); Qixin Chen, Beijing (CN)

(73) Assignee: Tsinghua University, Beijing (CN)

( * ) Notice: Subject to any disclaimer, the term of this patent is extended or adjusted under 35 U.S.C. 154(b) by 226 days.

(21) Appl. No.: 14/661,927

(22) Filed: Mar. 18, 2015

(65) Prior Publication Data

US 2015/0268644 A1  Sep. 24, 2015

(30) Foreign Application Priority Data

Mar. 20, 2014 (CN) .......................... 2014 1 0106630

(51) Int. Cl.
*H02J 3/00* (2006.01)
*G06F 17/11* (2006.01)
*H02J 3/06* (2006.01)

(52) U.S. Cl.
CPC ............... *H02J 3/00* (2013.01); *G06F 17/11* (2013.01); *H02J 3/008* (2013.01); *H02J 3/06* (2013.01); *Y04S 50/10* (2013.01)

(58) Field of Classification Search
None
See application file for complete search history.

(56) References Cited

U.S. PATENT DOCUMENTS

| 2011/0071690 A1* | 3/2011 | Sun ........................ G06Q 10/06 700/286 |
| 2012/0095830 A1* | 4/2012 | Contreras Delpiano ............................. G06Q 30/02 705/14.49 |
| 2013/0346139 A1* | 12/2013 | Steven ............. G06Q 10/06314 705/7.24 |
| 2014/0039710 A1* | 2/2014 | Carter .................... G06Q 10/06 700/291 |
| 2014/0188689 A1* | 7/2014 | Kalsi ........................ H02J 3/16 705/37 |
| 2015/0127425 A1* | 5/2015 | Greene .............. G06Q 30/0202 705/7.31 |
| 2015/0303689 A1* | 10/2015 | Collantes ................ H02S 50/10 700/295 |

* cited by examiner

*Primary Examiner* — Jason Lin
(74) *Attorney, Agent, or Firm* — Kile Park Reed & Houtteman LLC

(57) ABSTRACT

An optimal control method and apparatus for a power system are provided. The method includes: obtaining ancillary service bidding data; establishing a power system optimal control model according to the ancillary service bidding data; solving the power system optimal control model to obtain optimal frequency regulation capacities and optimal spinning reserve capacities; sending the optimal frequency regulation capacities and the optimal spinning reserve capacities to generators such that the generators adjust their active powers to provide ancillary services for the power system.

12 Claims, 3 Drawing Sheets

OPTIMAL CONTROL METHOD AND APPARATUS FOR POWER SYSTEM FREQUENCY AND RESERVE REGULATION WITH ASYMMETRIC INFORMATION

CROSS-REFERENCE TO RELATED APPLICATION

This application claims priority to and benefits of Chinese Patent Application No. 201410106630.7, filed with the State Intellectual Property Office of P. R. China on Mar. 20, 2014, the entire content of which is incorporated herein by reference.

FIELD

The present disclosure relates to a field of a power system control technology, and more particularly relates to an optimal control method for a power system and an optimal control apparatus for a power system.

BACKGROUND

A power system consists of a power generation part, a power transmission part, a power distribution part, a power utilization part and so on. In order to maintain a safe and stable operation of the power system or to restore a security of the power system, and to ensure a supply of power, and to meet a requirement such as a voltage and a frequency quality, the power system requires enough frequency regulation, spinning reserve and other ancillary services. With regard to a problem how to determine the frequency regulation, the spinning reserve and other ancillary services in the power system, there may be many different methods.

In a vertically integrated electricity system, it is considered an obligation that generators provide the frequency regulation, the spinning reserve and other ancillary services, however, if the ancillary services are provided freely for a long-term, it may lead to a low initiative of a power plant for maintaining the security and the reliability of the power system.

In an electricity market environment, the power plant is an independent market participant and should get a corresponding economic compensation for providing the frequency regulation, the spinning reserve and other ancillary services for the operation of the power system. In a county with a marketization of the electricity, usually, the frequency regulation, the spinning reserve and other ancillary services in the power system are determined by a mode of market competition according to ancillary service bidding data of the power plant, and a cost of the ancillary services is ultimately borne by users. This method may lead to the higher ancillary service price reported by the power plant, and enable that the cost of the ancillary services soar, and result in a disorder market competition, and affect the safe and stable operation of the power system.

In addition, in the electricity market environment, both the power plant and the Power Grid Corp are independent market participants, so the power plant and the Power Grid Corp cannot completely know each other's private information, and this condition is known as an information asymmetry. The conventional various methods do not have a function to find a real cost of the frequency regulation, the spinning reserve and other ancillary services, thus resulting in a disorder market competition in the ancillary services and affecting the safe and stable of the operation of the power system.

SUMMARY

The present disclosure provides an optimal control method for a power system and an optimal control apparatus for a power system to solve at least one of the problems existing in the related art to at least some extent. With the method or the apparatus according to embodiments of the present disclosure, based on that the security, stability and orderliness of the operation of the power system is improved, the power plant may report an ancillary service (such as the frequency regulation, the spinning reserve) bid rationally.

According to a first aspect of embodiments of the present disclosure, there is provided an optimal control method for a power system, including: obtaining ancillary service bidding data of generators of a next control cycle, in which the ancillary service bidding data comprises frequency regulation capacities in each control period of the next control cycle and first prices corresponding to the frequency regulation capacities, and spinning reserve capacities in each control period of the next control cycle and second prices corresponding to the spinning reserve capacities; establishing a power system optimal control model according to the frequency regulation capacities in each control period of the next control cycle and the first prices, and the spinning reserve capacities in each control period of the next control cycle and the second prices; solving the power system optimal control model to obtain optimal frequency regulation capacities in each control period of the next control cycle and optimal spinning reserve capacities in each control period of the next control cycle; sending the optimal frequency regulation capacities in each control period of the next control cycle and the optimal spinning reserve capacities in each control period of the next control cycle to generators such that the generators adjust their active powers to provide ancillary services for the power system.

In some embodiments, the power system optimal control model is denoted according to formula (1), $$\min \sum_{i=1}^{N} \sum_{t=1}^{T} (C_{i,t}^r R_{i,t}^r + C_{i,t}^s R_{i,t}^s) \quad (1)$$

s.t.

$$R_t^{r,min} \leq \sum_{i=1}^{N} R_{i,t}^r, \ t = 1, 2, \ldots, T$$

$$R_t^{s,min} \leq \sum_{i=1}^{N} R_{i,t}^s, \ t = 1, 2, \ldots, T$$

$$R_{i,t}^r + R_{i,t}^s + P_{i,t} \leq P_{i,max}, \ i = 1, 2, \ldots, N; \ t = 1, 2, \ldots, T$$

where N represents a number of the generators, T represents a number of control periods in the next control cycle, $R_{i,t}^r$ represents a frequency regulation capacity provided by a $i^{th}$ generator in a $t^{th}$ control period, $C_{i,t}^r$ represents a first price of the frequency regulation capacity provided by the $i^{th}$ generator in the $t^{th}$ control period, $R_{i,t}^s$ represents a spinning reserve capacity provided by the $i^{th}$ generator in the $t^{th}$ control period, $C_{i,t}^s$ represents a second price of the spinning reserve capacity provided by the $i^{th}$ generator in the $t^{th}$ control period, $R_t^{r,min}$ represents a lower limit of a required frequency regulation capacity in the power system in the $t^{th}$ control period, $R_t^{s,min}$ represents a lower limit of a required spinning reserve capacity in the power system in the $t^{th}$ control period, $P_{i,t}$ represents an active power of the $i^{th}$ generator in the $t^{th}$ control period, $P_{i,max}$ represents a maximum active power of the $i^{th}$ generator in the $t^{th}$ control period.

In some embodiments, the next control cycle is one day.

In some embodiments, the method further includes: determining a first unit marginal price of frequency regulation capacities in the $t^{th}$ control period, wherein the first unit marginal price is a maximal value in first prices of frequency regulation capacities provided by the generators in the $t^{th}$ control period;

obtaining a first sum of prices of generators providing frequency regulation capacities in the $t^{th}$ control period according to formula (2), $$C_t^r = \sum_{j=1}^{N_r} R_{j,t}^r C_{m,t}^r, t = 1, 2, \ldots, T \quad (2)$$

where $C_t^r$ represents the first sum of prices, $N_r$ represents a number of generators providing frequency regulation capacities in the $t^{th}$ control period, $R_{j,t}^r$ represents a frequency regulation capacity provided by a $j^{th}$ generator of the generators providing frequency regulation capacities in the $t^{th}$ control period, $C_{m,t}^r$ represents the first unit marginal price of frequency regulation capacities in the $t^{th}$ control period;

obtaining first fees paid by generators not providing frequency regulation capacities in the $t^{th}$ control period according to formula (3), $$F_{k,t}^r = C_t^r \cdot \frac{P_{k,t}^w}{D_t} \quad (3)$$

where $1 \leq k \leq N_{nr}$, $N_{nr}$ represents a number of generators not providing frequency regulation capacities in the $t^{th}$ control period, $F_{k,t}^r$ represents a first fee paid by a $k^{th}$ generator of the generators not providing frequency regulation capacities in the $t^{th}$ control period, $P_{k,t}^w$ represents an active power of the $k^{th}$ generator of the generators not providing frequency regulation capacities in the $t^{th}$ control period, $D_t$ represents a sum of active powers of the generators not providing frequency regulation capacities in the $t^{th}$ control period;

obtaining compensation for the generators providing frequency regulation capacities in the $t^{th}$ control period according to formula (4), $$J_{j,t}^r = R_{j,t}^r C_{m,t}^r \quad (4)$$

where $1 \leq j \leq N_r$, $J_{j,t}^r$, represents compensation for the $j^{th}$ generator of the generators providing frequency regulation capacities in the $t^{th}$ control period.

In some embodiments, the method further includes: determining a second unit marginal price of spinning reserve capacities in the $t^{th}$ control period, wherein the second unit marginal price is a maximal value in second prices of spinning reserve capacities provided by the generators in the $t^{th}$ control period;

obtaining a second sum of prices of generators providing spinning reserve capacities in the $t^{th}$ control period according to formula (5), $$C_t^s = \sum_{j_1=1}^{N_s} R_{j_1,t}^s C_{m,t}^s, t = 1, 2, \ldots, T \quad (5)$$

where $C_t^s$ represents the second sum of prices, $N_s$ represents a number of generators providing spinning reserve capacities in the $t^{th}$ control period, $R_{j_1,t}^s$ represents a spinning reserve capacity provided by a $j_1^{th}$ generator of the generators providing spinning reserve capacities in the $t^{th}$ control period, $C_{m,t}^s$ represents the second unit marginal price of spinning reserve capacities in the $t^{th}$ control period;

obtaining second fees paid by generators not providing spinning reserve capacities in the $t^{th}$ control period according to formula (6), $$F_{k_1,t}^s = C_t^s \cdot \frac{P_{k_1,t}^w}{D_t} \quad (6)$$

where $1 \leq k_1 \leq N_{ns}$, $N_{ns}$ represents a number of generators not providing spinning reserve capacities in the $t^{th}$ control period, $F_{k_1,t}^s$, represents a second fee paid by a $k_1^{th}$ generator of the generators not providing spinning reserve capacities in the $t^{th}$ control period, $P_{k_1,t}^w$ represents an active power of the $k_1^{th}$ generator of the generators not providing spinning reserve capacities in the $t^{th}$ control period, $D_t$ represents a sum of active powers of the generators not providing spinning reserve capacities in the $t^{th}$ control period;

obtaining compensation for the generators providing spinning reserve capacities in the $t^{th}$ control period according to formula (7), $$J_{j_1,t}^s = R_{j_1,t}^s C_{m,t}^s \quad (7)$$

where $1 \leq j_1 \leq N_s$, $J_{j_1,t}^s$ represents compensation for the $j_1^{th}$ generator of the generators providing spinning reserve capacities in the $t^{th}$ control period.

According to a second aspect of embodiments of the present disclosure, there is provided an optimal control apparatus for a power system, including: a processor; a memory configured to store an instruction executable by the processor; in which the processor is configured to: obtain ancillary service bidding data of generators of a next control cycle, wherein the ancillary service bidding data comprises frequency regulation capacities in each control period of the next control cycle and first prices corresponding to the frequency regulation capacities, and spinning reserve capacities in each control period of the next control cycle and second prices corresponding to the spinning reserve capacities; establish a power system optimal control model according to the frequency regulation capacities in each control period of the next control cycle and the first prices, and the spinning reserve capacities in each control period of the next control cycle and the second prices; solve the power system optimal control model to obtain optimal frequency regulation capacities in each control period of the next control cycle and optimal spinning reserve capacities in each control period of the next control cycle; send the optimal frequency regulation capacities in each control period of the next control cycle and the optimal spinning reserve capacities in each control period of the next control cycle to generators such that the generators adjust their active powers to provide ancillary services for the power system.

In some embodiments, the power system optimal control model is denoted according to formula (1), $$\min \sum_{i=1}^{N} \sum_{t=1}^{T} (C_{i,t}^r R_{i,t}^r + C_{i,t}^s R_{i,t}^s) \quad (1)$$

s.t.

$$R_t^{r,min} \leq \sum_{i=1}^{N} R_{i,t}^r, t = 1, 2, \ldots, T$$

-continued $$R_t^{s,min} \leq \sum_{i=1}^{N} R_{i,t}^s, t = 1, 2, \ldots, T$$

$$R_{i,t}^r + R_{i,t}^s + P_{i,t} \leq P_{i,max}, i = 1, 2, \ldots, N; t = 1, 2, \ldots, T$$

where N represents a number of the generators, T represents a number of control periods in the next control cycle, $R_{i,t}^r$ represents a frequency regulation capacity provided by a $i^{th}$ generator in a $t^{th}$ control period, $C_{i,t}^r$, represents a first price of the frequency regulation capacity provided by the $i^{th}$ generator in the $t^{th}$ control period, $R_{i,t}^s$ represents a spinning reserve capacity provided by the $i^{th}$ generator in the $t^{th}$ control period, $C_{i,t}^s$ represents a second price of the spinning reserve capacity provided by the $i^{th}$ generator in the $t^{th}$ control period, $R_t^{r,min}$ represents a lower limit of a required frequency regulation capacity in the power system in the $t^{th}$ control period, $R_t^{s,min}$ represents a lower limit of a required spinning reserve capacity in the power system in the $t^{th}$ control period, $P_{i,t}$ represents an active power of the $i^{th}$ generator in the $t^{th}$ control period, $P_{i,max}$ represents a maximum active power of the $i^{th}$ generator in the $t^{th}$ control period.

In some embodiments, the next control cycle is one day.

In some embodiments, the processor is further configured to:

determine a first unit marginal price of frequency regulation capacities in the $t^{th}$ control period, wherein the first unit marginal price is a maximal value in first prices of frequency regulation capacities provided by the generators in the $t^{th}$ control period;

obtain a first sum of prices of generators providing frequency regulation capacities in the $t^{th}$ control period according to formula (2), $$C_t^r = \sum_{j=1}^{N_r} R_{j,t}^r C_{m,t}^r, t = 1, 2, \ldots, T \quad (2)$$

where $C_t^r$ represents the first sum of prices, $N_r$ represents a number of generators providing frequency regulation capacities in the $t^{th}$ control period, $R_{j,t}^r$ represents a frequency regulation capacity provided by a $j^{th}$ generator of the generators providing frequency regulation capacities in the $t^{th}$ control period, $C_{m,t}^r$ represents the first unit marginal price of frequency regulation capacities in the $t^{th}$ control period;

obtain first fees paid by generators not providing frequency regulation capacities in the $t^{th}$ control period according to formula (3), $$F_{k,t}^r = C_t^r \cdot \frac{P_{k,t}^w}{D_t} \quad (3)$$

where $1 \leq k \leq N_{nr}$, $N_{nr}$ represents a number of generators not providing frequency regulation capacities in the $t^{th}$ control period, $F_{k,t}^r$, represents a first fee paid by a $k^{th}$ generator of the generators not providing frequency regulation capacities in the $t^{th}$ control period, $P_{k,t}^w$ represents an active power of the $k^{th}$ generator of the generators not providing frequency regulation capacities in the $t^{th}$ control period, $D_t$ represents a sum of active powers of the generators not providing frequency regulation capacities in the $t^{th}$ control period;

obtain compensation for the generators providing frequency regulation capacities in the $t^{th}$ control period according to formula (4), $$J_{j,t}^r = R_{j,t}^r C_{m,t}^r \quad (4)$$

where $1 \leq j \leq N_r$, $J_{j,t}^r$ represents compensation for the $j^{th}$ generator of the generators providing frequency regulation capacities in the $t^{th}$ control period.

In some embodiments, the processor is further configured to:

determine a second unit marginal price of spinning reserve capacities in the $t^{th}$ control period, wherein the second unit marginal price is a maximal value in second prices of spinning reserve capacities provided by the generators in the $t^{th}$ control period;

obtain a second sum of prices of generators providing spinning reserve capacities in the $t^{th}$ control period according to formula (5), $$C_t^s = \sum_{j_1=1}^{N_s} R_{j_1,t}^s C_{m,t}^s, t = 1, 2, \ldots, T \quad (5)$$

where $C_t^s$ represents the second sum of prices, $N_s$ represents a number of generators providing spinning reserve capacities in the $t^{th}$ control period, $R_{j_1,t}^s$ represents a spinning reserve capacity provided by a $j_1^{th}$ generator of the generators providing spinning reserve capacities in the $t^{th}$ control period, $C_{m,t}^s$ represents the second unit marginal price of spinning reserve capacities in the $t^{th}$ control period;

obtain second fees paid by generators not providing spinning reserve capacities in the $t^{th}$ control period according to formula (6), $$F_{k_1,t}^s = C_t^s \cdot \frac{P_{k_1,t}^w}{D_t} \quad (6)$$

where $1 \leq k_1 \leq N_{ns}$, $N_{ns}$ represents a number of generators not providing spinning reserve capacities in the $t^{th}$ control period, $F_{k_1,t}^s$ represents a second fee paid by a $k_1^{th}$ generator of the generators not providing spinning reserve capacities in the $t^{th}$ control period, $P_{k_1,t}^w$ represents an active power of the $k_1^{th}$ generator of the generators not providing spinning reserve capacities in the $t^{th}$ control period, $D_t$ represents a sum of active powers of the generators not providing spinning reserve capacities in the $t^{th}$ control period;

obtain compensation for the generators providing spinning reserve capacities in the $t^{th}$ control period according to formula (7), $$J_{j_1,t}^s = R_{j_1,t}^s C_{m,t}^s \quad (7)$$

where $1 \leq j_1 \leq N_s$, $J_{j_1,t}^s$ represents compensation for the $j_1^{th}$ generator of the generators providing spinning reserve capacities in the $t^{th}$ control period.

The technical solutions provided by embodiments of the present disclosure have following advantageous effects.

In the optimal control method for a power system according to embodiments of the present disclosure, the power plants submit the ancillary service bidding data of frequency regulation capacities and spinning reserve capacities to the Power Grid Corp; the Power Grid Corp establishes the power system optimal control model according to the ancillary service bidding data; the Power Grid Corp solves the power system optimal control model to obtain optimal frequency regulation capacities and optimal spinning reserve capacities, and sends the optimal frequency regulation capacities and the optimal spinning reserve capacities as control signals to the generators; the power plants provide the frequency regulation capacities and the spinning reserve capacities according to the control signals. With the optimal control method according to embodiments of the present disclosure, randomness in conventional various methods can be avoided, and the level of the safe and stable operation of the power system can be improved.

In addition, with the optimal control method according to embodiments of the present disclosure, the Power Grid Corp may get assistance to promote the economy of calling by the Power Grid Corp the generators to supply the ancillary services according to the ancillary service bidding data provided by the power plants and the requirements of the ancillary services in the power system. The fees of the generators providing the ancillary services can be compensated by the generators not providing the ancillary services, thus guiding the power plants to submit the ancillary service bidding data rationally.

Usually, with the optimal control method according to embodiments of the present disclosure, profit space may be created for the power plants which will to supply the ancillary services and have a good frequency regulation performance, and the initiatives of providing by the power plants the ancillary services can be greatly enhanced, such that the strong technical support to enhance the level of the safe and stable operation of the power system can be provided, and the present disclosure has the important contemporary relevance and good application prospect.

According to a third aspect of embodiments of the present disclosure, there is provided a non-transitory computer-readable storage medium having stored therein instructions that, when executed by a processor of a terminal, causes the terminal to perform an optimal control method for a power system, the optimal control method for a power system includes: obtaining ancillary service bidding data of generators of a next control cycle, in which the ancillary service bidding data comprises frequency regulation capacities in each control period of the next control cycle and first prices corresponding to the frequency regulation capacities, and spinning reserve capacities in each control period of the next control cycle and second prices corresponding to the spinning reserve capacities; establishing a power system optimal control model according to the frequency regulation capacities in each control period of the next control cycle and the first prices, and the spinning reserve capacities in each control period of the next control cycle and the second prices; solving the power system optimal control model to obtain optimal frequency regulation capacities in each control period of the next control cycle and optimal spinning reserve capacities in each control period of the next control cycle; sending the optimal frequency regulation capacities in each control period of the next control cycle and the optimal spinning reserve capacities in each control period of the next control cycle to generators such that the generators adjust their active powers to provide ancillary services for the power system.

The above summary of the present disclosure is not intended to describe each disclosed embodiment or every implementation of the present disclosure. The Figures and the detailed descriptions which follow more particularly exemplify illustrative embodiments.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
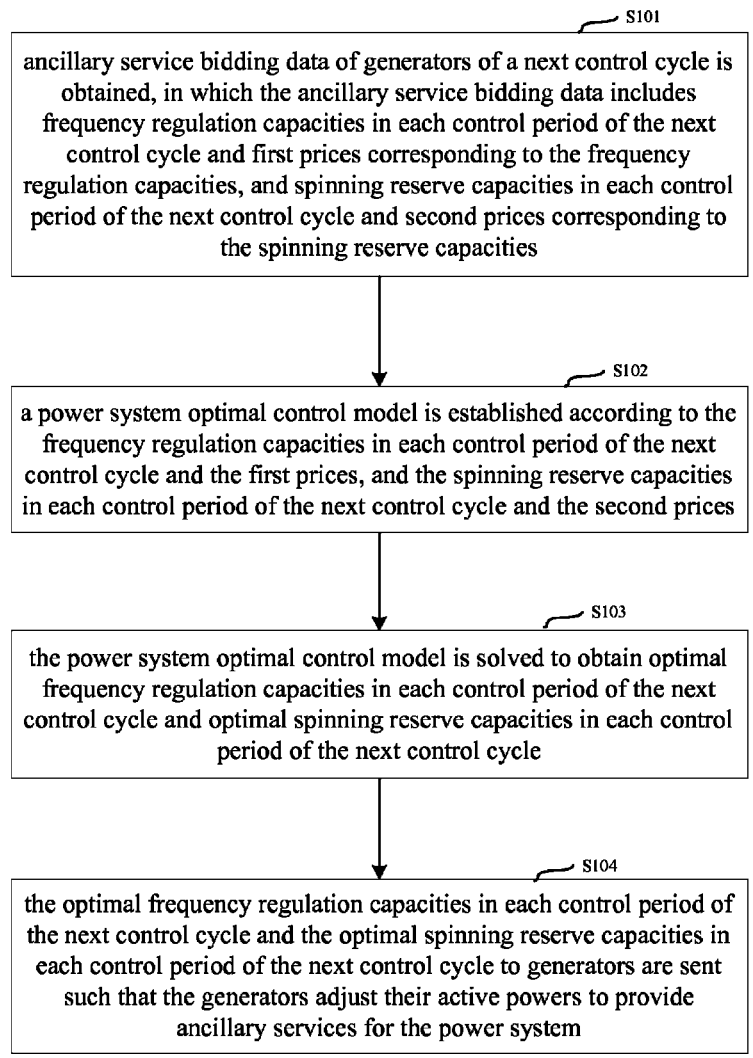
FIG. 1 is a flow chart of an optimal control method for a power system according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In addition, terms such as "first" and "second" are used herein for purposes of description and are not intended to indicate or imply relative importance or significance. Thus, the feature defined with "first" and "second" may comprise one or more this feature. In the description of the present disclosure, the term "a plurality of" means two or more than two, unless specified otherwise.

In the following, an optimal control method for a power system according to embodiments of the present disclosure will be described in detail with reference to the drawings.

FIG. 1 is the flow chart of an optimal control method for a power system according to an embodiment of the present disclosure. As shown in FIG. 1, the optimal control method for a power system includes following steps.

In step S101, ancillary service bidding data of generators of a next control cycle is obtained, in which the ancillary service bidding data includes frequency regulation capacities in each control period of the next control cycle and first prices corresponding to the frequency regulation capacities, and spinning reserve capacities in each control period of the next control cycle and second prices corresponding to the spinning reserve capacities.

In some embodiments, the next control cycle is one day.

Specifically, a power plant at present may submit the ancillary service bidding data of generators of the next control cycle to the Power Grid Corp according to a production plan of the next control cycle, in which the ancillary services include the frequency regulation and the spinning reserve.

In step S102, a power system optimal control model is established according to the frequency regulation capacities in each control period of the next control cycle and the first prices, and the spinning reserve capacities in each control period of the next control cycle and the second prices.

The power system optimal control model consists of an objective function and constraints, specifically, a step of establishing the power system optimal control model may include following steps.

(1). the objective function of the power system optimal control model is denoted according to formula (1-1):

$$\min \sum_{i=1}^{N} \sum_{t=1}^{T} (C_{i,t}^{r} R_{i,t}^{r} + C_{i,t}^{s} R_{i,t}^{s}) \tag{1-1}$$

where i represents a subscript of the generators, t represents a subscript of control periods in the next control cycle, N represents a number of the generators, T represents a number of the control periods in the next control cycle, $R_{i,t}^{r}$ represents a frequency regulation capacity provided by a $i^{th}$ generator in a $t^{th}$ control period, $C_{i,t}^{r}$ represents a first price of the frequency regulation capacity provided by the $i^{th}$ generator in the $t^{th}$ control period, $R_{i,t}^{s}$ represents a spinning reserve capacity provided by the $i^{th}$ generator in the $t^{th}$ control period, $C_{i,t}^{s}$ represents a second price of the spinning reserve capacity provided by the $i^{th}$ generator in the $t^{th}$ control period.

(2). the constraints of the power system optimal control model are denoted according to formulas (1-2) to (1-4):

(I). a constraint of the frequency regulation in the power system, which can be denoted as formula (1-2):

$$R_t^{r,min} \le \sum_{i=1}^{N} R_{i,t}^{r}, t = 1, 2, \ldots, T \tag{1-2}$$

where $R_t^{r,min}$ represents a lower limit of a required frequency regulation capacity in the power system in the $t^{th}$ control period, t is a natural number between 1 and T.

(II). a constraint of the spinning reserve in the power system, which can be denoted as formula (1-3):

$$R_t^{s,min} \le \sum_{i=1}^{N} R_{i,t}^{s}, t = 1, 2, \ldots, T \tag{1-3}$$

where $R_t^{s,min}$ represents a lower limit of a required spinning reserve capacity in the power system in the $t^{th}$ control period, t is a natural number between 1 and T.

(III). a constraint of a capacity of a generator, which can be denoted as formula (1-4):

$$R_{i,t}^{r} + R_{i,t}^{s} + P_{i,t} \le P_{i,max}, i=1,2,\ldots,N; t=1,2,\ldots,T \tag{1-4}$$

where $P_{i,t}$ represents an active power of the $i^{th}$ generator in the $t^{th}$ control period, $P_{i,max}$ represents a maximum active power of the $i^{th}$ generator in the $t^{th}$ control period, i is a natural number between 1 and N, t is a natural number between 1 and T.

In step S103, the power system optimal control model is solved to obtain optimal frequency regulation capacities in each control period of the next control cycle and optimal spinning reserve capacities in each control period of the next control cycle.

Specifically, for all generators, the optimal values of controlled variables $R_{i,t}^{r}$ and $R_{i,t}^{s}$ may be obtained by solving the power system optimal control model in each control period of the next control cycle T. And the optimal values of $R_{i,t}^{r}$ are considered as the optimal frequency regulation capacities in each control period of the next control cycle, and the optimal values of $R_{i,t}^{s}$ are considered as the optimal spinning reserve capacities in each control period of the next control.

In step S104, the optimal frequency regulation capacities in each control period of the next control cycle and the optimal spinning reserve capacities in each control period of the next control cycle to generators are sent such that the generators adjust their active powers to provide ancillary services for the power system.

Specifically, the optimal values of variables $R_{i,t}^{r}$ and $R_{i,t}^{s}$ may be considered as control target values and be sent by the Power Grid Corp to the generators. And the optimal values of variables $R_{i,t}^{r}$ may be considered as control signals of the frequency regulation for the generators, and the optimal values of $R_{i,t}^{s}$ may be considered as control signals of the spinning reserve for the generators.

Each generator adjusts the active power output in real-time according to the control signals to provide the frequency regulation service and the spinning reserve service for the power system.

After each generator adjusts the active power output according to the control signals for the power system, the fees corresponding to the frequency regulation services or the spinning reserve services of the generators providing the frequency regulation services or the spinning reserve services can be compensated by the generators not providing the frequency regulation services or the spinning reserve services.

Figure 2:
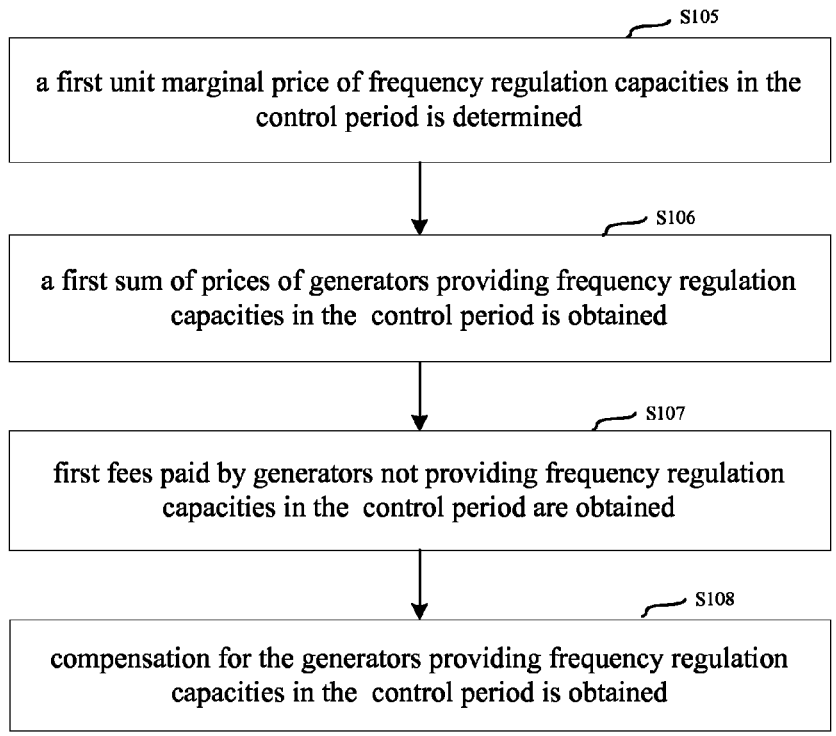
FIG. 2 is a flow chart of a calculation method of fees corresponding to frequency regulation services according to an embodiment of the present disclosure.

FIG. 2 is the flow chart of a calculation method of fees corresponding to frequency regulation services according to an embodiment of the present disclosure. As shown in FIG. 2, the optimal control method for a power system further includes following steps.

In step S105, a first unit marginal price of frequency regulation capacities in the $t^{th}$ control period is determined, in which the first unit marginal price is a maximal value in first prices of frequency regulation capacities provided by the generators in the $t^{th}$ control period.

In step S106, a first sum of prices of generators providing frequency regulation capacities in the $t^{th}$ control period is obtained according to formula (2), $$C_t^r = \sum_{j=1}^{N_r} R_{j,t}^{r} C_{m,t}^{r}, t = 1, 2, \ldots, T \tag{2}$$

where $C_t^r$ represents the first sum of prices, $N_r$ represents a number of generators providing frequency regulation capacities in the $t^{th}$ control period, $R_{j,t}^{r}$ represents a frequency regulation capacity provided by $j^{th}$ generator of the generators providing frequency regulation capacities in the $t^{th}$ control period, $C_{m,t}^{r}$ represents the first unit marginal price of frequency regulation capacities in the $t^{th}$ control period.

In step S107, first fees paid by generators not providing frequency regulation capacities in the $t^{th}$ control period are obtained according to formula (3), $$F_{k,t}^{r} = C_t^{r} \cdot \frac{P_{k,t}^{w}}{D_t} \tag{3}$$

where $1 \le k \le N_{nr}$, $N_{nr}$ represents a number of generators not providing frequency regulation capacities in the $t^{th}$ control period, $F_{k,t}^{r}$ represents a first fee paid by a $k^{th}$ generator of the generators not providing frequency regulation capacities in the $t^{th}$ control period, $P_{k,t}^w$ represents an active power of the $k^{th}$ generator of the generators not providing frequency regulation capacities in the $t^{th}$ control period, $D_t$ represents a sum of active powers of the generators not providing frequency regulation capacities in the $t^{th}$ control period.

In step S108, compensation for the generators providing frequency regulation capacities in the $t^{th}$ control period is obtained according to formula (4), $$J_{j,t}^r = R_{j,t}^r C_{m,t}^r \tag{4}$$

where $1 \leq j \leq N_r$, $J_{j,t}^r$ represents compensation for the $j^{th}$ generator of the generators providing frequency regulation capacities in the $t^{th}$ control period.

The generators not providing the frequency regulation services may pay compensation as was described above, correspondingly the generators providing the frequency regulation services may get first fees as was described above.

Figure 3:
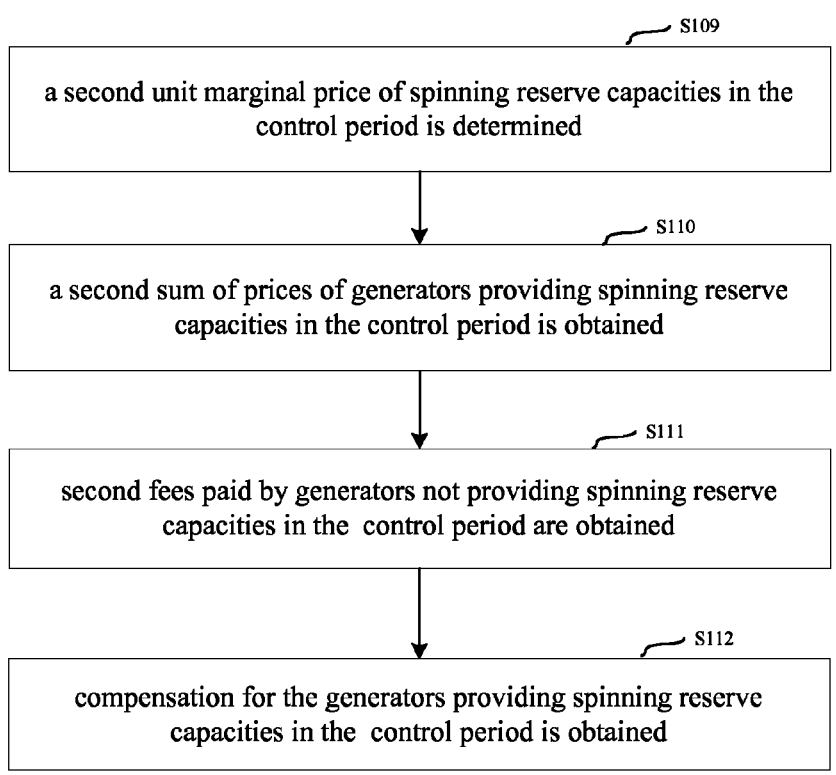
FIG. 3 is a flow chart of a calculation method of fees corresponding to spinning reserve services according to an embodiment of the present disclosure.
Figure 4:
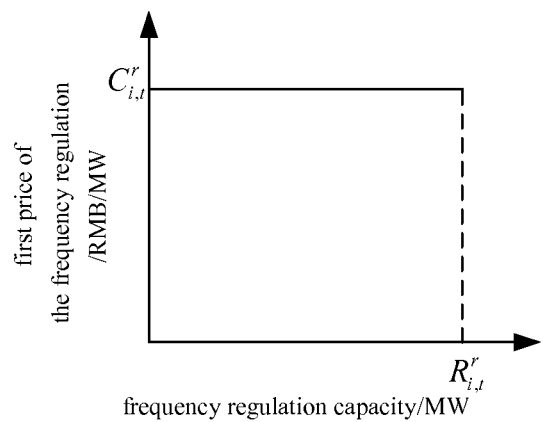
FIG. 4 is a schematic diagram illustrating a curve of bidding data of frequency regulation capacities submitted to the Power Grid Corp by a power plant.
Figure 5:
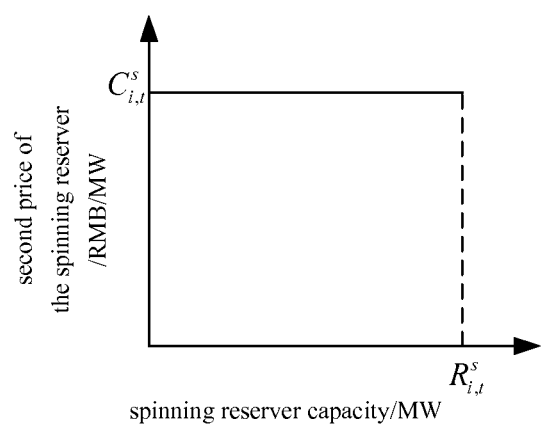
FIG. 5 is a schematic diagram illustrating a curve of bidding data of spinning reserve capacities submitted to the Power Grid Corp by a power plant.

FIG. 3 is the flow chart of a calculation method of fees corresponding to spinning reserve services according to an embodiment of the present disclosure. As shown in FIG. 3, the optimal control method for a power system further includes following steps.

In step S109, a second unit marginal price of spinning reserve capacities in the $t^{th}$ control period is determined, in which the second unit marginal price is a maximal value in second prices of spinning reserve capacities provided by the generators in the $t^{th}$ control period.

In step S110, a second sum of prices of generators providing spinning reserve capacities in the $t^{th}$ control period is obtained according to formula (5), $$C_t^s = \sum_{j_1=1}^{N_s} R_{j_1,t}^s C_{m,t}^s, \ t = 1, 2, \ldots, T \tag{5}$$

where $C_t^s$ represents the second sum of prices, $N_s$ represents a number of generators providing spinning reserve capacities in the $t^{th}$ control period, $R_{j_1,t}^s$ represents a spinning reserve capacity provided by a $j_1^{th}$ generator of the generators providing spinning reserve capacities in the $t^{th}$ control period, $C_{m,t}^s$ represents the second unit marginal price of spinning reserve capacities in the $t^{th}$ control period.

In step S111, second fees paid by generators not providing spinning reserve capacities in the $t^{th}$ control period are obtained according to formula (6), $$F_{k_1,t}^s = C_t^s \cdot \frac{P_{k_1,t}^w}{D_t} \tag{6}$$

where $1 \leq k \leq N_{ns}$, $N_{ns}$ represents a number of generators not providing spinning reserve capacities in the $t^{th}$ control period, $F_{k_1,t}^s$ represents a second fee paid by a $k_1^{th}$ generator of the generators not providing spinning reserve capacities in the $t^{th}$ control period, $P_{k_1,t}^w$ represents an active power of the $k_1^{th}$ generator of the generators not providing spinning reserve capacities in the $t^{th}$ control period, $D_t$ represents a sum of active powers of the generators not providing spinning reserve capacities in the $t^{th}$ control period.

In step S112, compensation for the generators providing spinning reserve capacities in the $t^{th}$ control period is obtained according to formula (7), $$J_{j_1,t}^s = R_{j_1,t}^s C_{m,t}^s \tag{7}$$

where $1 \leq j_1 \leq N_s$, $J_{j_1,t}^s$ represents compensation for the $j_1^{th}$ generator of the generators providing spinning reserve capacities in the $t^{th}$ control period.

The generators not providing the spinning reserve services may pay compensation as was described above, correspondingly, the generators providing the spinning reserve services may get second fees as was described above.

An embodiment:

In order to better illustrate the principle of the optimal control method according to embodiments of the present disclosure, take a power system of IEEE-30 buses in one control period as an example, in which the load of the power system is 255 MW, the frequency regulation requirement ($R_t^{r,min}$) of the power system is 6 MW, and the spinning reserve requirement ($R_t^{s,min}$) of the power system is 30 MW.

A maximum active power ($P_{i,max}$), a first price of the frequency regulation ($C_{i,t}^r$), a second price of the spinning reserve ($C_{i,t}^s$) of each generator can be shown as table 1.

TABLE 1

| generator | maximum active power/ MW | first price of the frequency regulation/ RMB/MW | second price of the spinning reserve/ RMB/MW |
|---|---|---|---|
| 1 | 80 | 67.87 | 70.60 |
| 2 | 80 | 75.77 | 3.18 |
| 3 | 50 | 74.31 | 27.69 |
| 4 | 55 | 39.22 | 40.62 |
| 5 | 30 | 65.55 | 9.71 |
| 6 | 40 | 17.12 | 82.35 |

In this embodiment, N=6, and T=1, and the power system optimal control model is expressed as:

$$\min \sum_{i=1}^{6} \sum_{t=1}^{1} (C_{i,t}^r R_{i,t}^r + C_{i,t}^s R_{i,t}^s)$$

s.t.

$$6 \leq \sum_{i=1}^{6} R_{i,t}^r, \ t = 1, 2, \ldots, T$$

$$30 \leq \sum_{i=1}^{6} R_{i,t}^s, \ t = 1, 2, \ldots, T$$

$$R_{i,t}^r + R_{i,t}^s + P_{i,t} \leq P_{i,max}, \ i = 1, 2, \ldots, 6; t = 1.$$

In this embodiment, the power system optimal control model is solved to obtain the optimal frequency regulation capacities ($R_{1,1}^r=0$, $R_{2,1}^r=0$, $R_{3,1}^r=0$, $R_{4,1}^r=2.75$, $R_{5,1}^r=1.25$, $R_{6,1}^r=2.0$) and the optimal spinning reserve capacities ($R_{1,1}^s=0$, $R_{2,1}^s=0$, $R_{3,1}^s=15$, $R_{4,1}^s=15$, $R_{5,1}^s=0$, $R_{6,1}^s=0$) in the control period. Thus, the generators providing frequency regulation capacities in the control period are generator 4, generator 5 and generator 6, and the generators providing spinning reserve capacities in the control period are generator 3 and generator 4.

And then, the first unit marginal price is determined as 65.55 RMB (a maximal value in 39.22, 65.55 and 17.12). The second unit marginal price is determined as 40.62 RMB (a maximal value in 27.69 and 40.62).

And then the first sum of prices of generators providing frequency regulation capacities in the control period may be obtained: $C_t^r=(2.75+1.25+2)*65.55=393.3$ RMB.

The second sum of prices of generators providing spinning reserve capacities in the control period may be obtained: $C_t^s=(15+15)*40.62=1218.6$ RMB.

Thus, in this embodiment, a frequency regulation capacity, a spinning reserve capacity, a first fee paid by a generator not providing the frequency regulation capacity, a second fee paid by a generator not providing the spinning reserve capacity, compensation for the generator providing the frequency regulation capacity, and compensation for the generator providing the spinning reserve capacity can be calculated according to the optimal control method for a power system according to embodiments of the present disclosure, which can be shown in table 2.

TABLE 2

| generator | the frequency regulation capacity/MW | the spinning reserve capacity/MW | active power output/MW | first fee/ RMB | second fee/RMB | compensation for the generator providing the frequency regulation capacity/RMB | compensation for the generator providing the spinning reserve capacity/RMB |
| --- | --- | --- | --- | --- | --- | --- | --- |
| 1 | 0.00 | 0.00 | 73.00 | 158.63 | 449.17 | 0.00 | 0.00 |
| 2 | 0.00 | 0.00 | 80.00 | 173.85 | 492.26 | 0.00 | 0.00 |
| 3 | 0.00 | 15.00 | 27.98 | 60.81 | 0.00 | 0.00 | 609.26 |
| 4 | 2.75 | 15.00 | 28.99 | 0.00 | 0.00 | 180.26 | 609.26 |
| 5 | 1.25 | 0.00 | 21.76 | 0.00 | 133.87 | 81.93 | 0.00 |
| 6 | 2.00 | 0.00 | 23.27 | 0.00 | 143.21 | 131.10 | 0.00 |

In the following, an optimal control apparatus for a power system according to embodiments of the present disclosure will be described in detail with reference to the drawings.

In some embodiments, the optimal control apparatus includes a processor; a memory configured to store an instruction executable by the processor, in which the processor is configured to:

obtain ancillary service bidding data of generators of a next control cycle, in which the ancillary service bidding data includes frequency regulation capacities in each control period of the next control cycle and first prices corresponding to the frequency regulation capacities, and spinning reserve capacities in each control period of the next control cycle and second prices corresponding to the spinning reserve capacities;

establish a power system optimal control model according to the frequency regulation capacities in each control period of the next control cycle and the first prices, and the spinning reserve capacities in each control period of the next control cycle and the second prices;

solve the power system optimal control model to obtain optimal frequency regulation capacities in each control period of the next control cycle and optimal spinning reserve capacities in each control period of the next control cycle;

send the optimal frequency regulation capacities in each control period of the next control cycle and the optimal spinning reserve capacities in each control period of the next control cycle to generators such that the generators adjust their active powers to provide ancillary services for the power system.

In some embodiments, the power system optimal control model is denoted according to formula (1), $$\min \sum_{i=1}^{N} \sum_{t=1}^{T} (C_{i,t}^r R_{i,t}^r + C_{i,t}^s R_{i,t}^s) \quad (1)$$

s.t.

$$R_t^{r,min} \le \sum_{i=1}^{N} R_{i,t}^r, t = 1, 2, \ldots, T$$

$$R_t^{s,min} \le \sum_{i=1}^{N} R_{i,t}^s, t = 1, 2, \ldots, T$$

$$R_{i,t}^r + R_{i,t}^s + P_{i,t} \le P_{i,max}, i = 1, 2, \ldots, N; t = 1, 2, \ldots, T$$

where i represents a subscript of the generators, t represents a subscript of control periods in the next control cycle, N represents a number of the generators, T represents a number of the control periods in the next control cycle, $R_{i,t}^r$ represents a frequency regulation capacity provided by a $i^{th}$ generator in a $t^{th}$ control period, $C_{i,t}^r$ a first price of the frequency regulation capacity provided by the $i^{th}$ generator in the $t^{th}$ control period, $R_{i,t}^s$ represents a spinning reserve capacity provided by the $i^{th}$ generator in the $t^{th}$ control period, $C_{i,t}^s$ represents a second price of the spinning reserve capacity provided by the $i^{th}$ generator in the $t^{th}$ control period, $R_t^{r,min}$ represents a lower limit of a required frequency regulation capacity in the power system in the $t^{th}$ control period, $R_t^{s,min}$ represents a lower limit of a required spinning reserve capacity in the power system in the $t^{th}$ control period, $P_{i,t}$ represents an active power of the $i^{th}$ generator in the $t^{th}$ control period, $P_{i,max}$ represents a maximum active power of the $i^{th}$ generator in the $t^{th}$ control period.

In some embodiments, the next control cycle is one day.

In some embodiments, the processor is further configured to:

determine a first unit marginal price of frequency regulation capacities in the $t^{th}$ control period, in which the first unit marginal price is a maximal value in first prices of frequency regulation capacities provided by the generators in the $t^{th}$ control period;

obtain a first sum of prices of generators providing frequency regulation capacities in the $t^{th}$ control period according to formula (2), $$C_t^r = \sum_{j=1}^{N_r} R_{j,t}^r C_{m,t}^r, t = 1, 2, \ldots, T \quad (2)$$

where $C_t^r$ represents the first sum of prices, $N_r$ represents a number of generators providing frequency regulation capacities in the $t^{th}$ control period, $R_{j,t}^r$ represents a frequency regulation capacity provided by a $j^{th}$ generator of the generators providing frequency regulation capacities in the $t^{th}$ control period, $C_{m,t}^r$ represents the first unit marginal price of frequency regulation capacities in the $t^{th}$ control period;

obtain first fees paid by generators not providing frequency regulation capacities in the $t^{th}$ control period according to formula (3), $$F_{k,t}^r = C_t^r \cdot \frac{P_{k,t}^w}{D_t} \quad (3)$$

where $1 \leq k \leq N_{nr}$, $N_{nr}$ represents a number of generators not providing frequency regulation capacities in the $t^{th}$ control period, $F_{k,t}^r$ represents a first fee paid by a $k^{th}$ generator of the generators not providing frequency regulation capacities in the $t^{th}$ control period, $P_{k,t}^w$ represents an active power of the $k^{th}$ generator of the generators not providing frequency regulation capacities in the $t^{th}$ control period, $D_t$ represents a sum of active powers of the generators not providing frequency regulation capacities in the $t^{th}$ control period;

obtain compensation for the generators providing frequency regulation capacities in the $t^{th}$ control period according to formula (4), $$J_{j,t}^r = R_{j,t}^r C_{m,t}^r \quad (4)$$

where $1 \leq j \leq N_r$, $J_{j,t}^r$ represents compensation for the $j^{th}$ generator of the generators providing frequency regulation capacities in the $t^{th}$ control period.

In some embodiments, the processor is further configured to:

determine a second unit marginal price of spinning reserve capacities in the $t^{th}$ control period, in which the second unit marginal price is a maximal value in second prices of spinning reserve capacities provided by the generators in the $t^{th}$ control period;

obtain a second sum of prices of generators providing spinning reserve capacities in the $t^{th}$ control period according to formula (5), $$C_t^s = \sum_{j_1=1}^{N_s} R_{j_1,t}^s C_{m,t}^s, \, t = 1, 2, \ldots, T \quad (5)$$

where $C_t^s$ represents the second sum of prices, $N_s$ represents a number of generators providing spinning reserve capacities in the $t^{th}$ control period, $R_{j_1,t}^s$ represents a spinning reserve capacity provided by a $j_1^{th}$ generator of the generators providing spinning reserve capacities in the $t^{th}$ control period, $C_{m,t}^s$ represents the second unit marginal price of spinning reserve capacities in the $t^{th}$ control period;

obtain second fees paid by generators not providing spinning reserve capacities in the $t^{th}$ control period according to formula (6), $$F_{k_1,t}^s = C_t^s \cdot \frac{P_{k_1,t}^w}{D_t} \quad (6)$$

where $1 \leq k_1 \leq N_{ns}$, $N_{ns}$ represents a number of generators not providing spinning reserve capacities in the $t^{th}$ control period, $F_{k_1,t}^s$ represents a second fee paid by a $k_1^{th}$ generator of the generators not providing spinning reserve capacities in the $t^{th}$ control period, $P_{k_1,t}^w$ represents an active power of the $k_1^{th}$ generator of the generators not providing spinning reserve capacities in the $t^{th}$ control period, $D_t$ represents a sum of active powers of the generators not providing spinning reserve capacities in the $t^{th}$ control period obtain compensation for the generators providing spinning reserve capacities in the $t^{th}$ control period according to formula (7), $$J_{j_1,t}^s = R_{j_1,t}^s C_{m,t}^s \quad (7)$$

where $1 \leq j_1 \leq N_s$, $J_{j_1,t}^s$ represents compensation for the $j_1^{th}$ generator of the generators providing spinning reserve capacities in the $t^{th}$ control period.

With respect to the apparatus in the above embodiments, the specific manners for performing operations for individual modules therein have been described in detail in the embodiments regarding the optimal control method for a power system, which are not elaborated herein again.

The technical solutions provided by embodiments of the present disclosure have following advantageous effects.

In the optimal control method for a power system according to embodiments of the present disclosure, the power plants submit the ancillary service bidding data of frequency regulation capacities and spinning reserve capacities to the Power Grid Corp; the Power Grid Corp establishes the power system optimal control model according to the ancillary service bidding data; the Power Grid Corp solves the power system optimal control model to obtain optimal frequency regulation capacities and optimal spinning reserve capacities, and sends the optimal frequency regulation capacities and the optimal spinning reserve capacities as control signals to the generators; the power plants provide the frequency regulation capacities and the spinning reserve capacities according to the control signals. With the optimal control method according to embodiments of the present disclosure, randomness in conventional various methods can be avoided, and the level of the safe and stable operation of the power system can be improved.

In addition, with the optimal control method according to embodiments of the present disclosure, the Power Grid Corp may get assistance to promote the economy of calling by the Power Grid Corp the generators to supply the ancillary services according to the ancillary service bidding data provided by the power plants and the requirements of the ancillary services in the power system. The fees of the generators providing the ancillary services can be compensated by the generators not providing the ancillary services, thus guiding the power plants to submit the ancillary service bidding data rationally.

Usually, with the optimal control method according to embodiments of the present disclosure, profit space may be created for the power plants which will to supply the ancillary services and have a good frequency regulation performance, and the initiatives of providing by the power plants the ancillary services can be greatly enhanced, such that the strong technical support to enhance the level of the safe and stable operation of the power system can be provided, and the present disclosure has the important contemporary relevance and good application prospect.

In the following, a non-transitory computer-readable storage medium according to embodiments of the present disclosure will be described in detail.

In some embodiments, the non-transitory computer-readable storage medium having stored therein instructions that, when executed by a processor of a terminal, causes the terminal to perform an optimal control method for a power system according to the above embodiments of the present disclosure for running an application program.

Any process or method described in the flowing diagram or other means may be understood as a module, segment or portion including one or more executable instruction codes of the procedures configured to achieve a certain logic function or process, and the preferred embodiments of the present disclosure include other performances, in which the performance may be achieved in other orders instead of the order shown or discussed, such as in a almost simultaneous way or in an opposite order, which should be appreciated by those having ordinary skills in the art to which embodiments of the present disclosure belong.

The logic and/or procedures indicated in the flowing diagram or described in other means herein, such as a constant sequence table of the executable code for performing a logical function, may be implemented in any computer readable storage medium so as to be adopted by the code execution system, the device or the equipment (such a system based on the computer, a system including a processor or other systems fetching codes from the code execution system, the device and the equipment, and executing the codes) or to be combined with the code execution system, the device or the equipment to be used. With respect to the description of the present invention, "the computer readable storage medium" may include any device including, storing, communicating, propagating or transmitting program so as to be used by the code execution system, the device and the equipment or to be combined with the code execution system, the device or the equipment to be used. The computer readable medium includes specific examples (a non-exhaustive list): the connecting portion (electronic device) having one or more arrangements of wire, the portable computer disc cartridge (a magnetic device), the random access memory (RAM), the read only memory (ROM), the electrically programmable read only memory (EPROMM or the flash memory), the optical fiber device and the compact disk read only memory (CDROM). In addition, the computer readable storage medium even may be papers or other proper medium printed with program, as the papers or the proper medium may be optically scanned, then edited, interpreted or treated in other ways if necessary to obtain the program electronically which may be stored in the computer memory.

It should be understood that, each part of the present invention may be implemented by the hardware, software, firmware or the combination thereof. In the above embodiments of the present invention, the plurality of procedures or methods may be implemented by the software or hardware stored in the computer memory and executed by the proper code execution system. For example, if the plurality of procedures or methods is to be implemented by the hardware, like in another embodiment of the present invention, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It can be understood by those having the ordinary skills in the related art that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The non-transitory computer-readable storage medium may be, but is not limited to, read-only memories, magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. An optimal control method for a power system, comprising:
    obtaining ancillary service bidding data of generators of a next control cycle, wherein the ancillary service bidding data comprises frequency regulation capacities in each control period of the next control cycle and first prices corresponding to the frequency regulation capacities, and spinning reserve capacities in each control period of the next control cycle and second prices corresponding to the spinning reserve capacities;
    establishing a power system optimal control model according to the frequency regulation capacities in each control period of the next control cycle and the first prices, and the spinning reserve capacities in each control period of the next control cycle and the second prices;
    solving the power system optimal control model to obtain optimal frequency regulation capacities in each control period of the next control cycle and optimal spinning reserve capacities in each control period of the next control cycle;
    adjusting active power output of each generator based on the optimal frequency regulation capacities in each control period of the next control cycle and the optimal spinning reserve capacities in each control period of the next control cycle, wherein the power system optimal control model is denoted according to formula (1), $$\min \sum_{i=1}^{N} \sum_{t=1}^{T} (C_{i,t}^r R_{i,t}^r + C_{i,t}^s R_{i,t}^s) \quad (1)$$

s.t.

$$R_t^{r,min} \le \sum_{i=1}^{N} R_{i,t}^r, t = 1, 2, \ldots, T$$

-continued $$R_t^{s,min} \le \sum_{i=1}^{N} R_{i,t}^s, t = 1, 2, \ldots, T$$

$$R_{i,t}^r + R_{i,t}^s + P_{i,t} \le P_{i,max}, i = 1, 2, \ldots, N; t = 1, 2, \ldots, T$$

where N represents a number of the generators, T represents a number of control periods in the next control cycle, $R_{i,t}^r$ represents a frequency regulation capacity provided by a $i^{th}$ generator in a $t^{th}$ control period, $C_{i,t}^r$ represents a first price of the frequency regulation capacity provided by the $i^{th}$ generator in the $t^{th}$ control period, $R_{i,t}^s$ represents a spinning reserve capacity provided by the $i^{th}$ generator in the $t^{th}$ control period, $C_{i,t}^s$ represents a second price of the spinning reserve capacity provided by the $i^{th}$ generator in the $t^{th}$ control period, $R_t^{r,min}$ represents a lower limit of a required frequency regulation capacity in the power system in the $t^{th}$ control period, $R_t^{s,min}$ represents a lower limit of a required spinning reserve capacity in the power system in the $t^{th}$ control period, $P_{i,t}$ represents an active power of the $i^{th}$ generator in the $t^{th}$ control period, $P_{i,max}$ represents a maximum active power of the $i^{th}$ generator in the $t^{th}$ control period.

2. The optimal control method according to claim 1, wherein the next control cycle is one day.

3. The optimal control method according to claim 1, further comprising:
   determining a first unit marginal price of frequency regulation capacities in the $t^{th}$ control period, wherein the first unit marginal price is a maximal value in first prices of frequency regulation capacities provided by the generators in the $t^{th}$ control period;
   obtaining a first sum of prices of generators providing frequency regulation capacities in the $t^{th}$ control period according to formula (2), $$C_t^r = \sum_{j=1}^{N_r} R_{j,t}^r C_{m,t}^r, t = 1, 2, \ldots, T \quad (2)$$

where $C_t^r$ represents the first sum of prices, $N_r$ represents a number of generators providing frequency regulation capacities in the $t^{th}$ control period, $R_{j,t}^r$ represents a frequency regulation capacity provided by a $j^{th}$ generator of the generators providing frequency regulation capacities in the $t^{th}$ control period, $C_{m,t}^r$ represents the first unit marginal price of frequency regulation capacities in the $t^{th}$ control period;
   obtaining first fees paid by generators not providing frequency regulation capacities in the $t^{th}$ control period according to formula (3), $$F_{k,t}^r = C_t^r \cdot \frac{P_{k,t}^w}{D_t} \quad (3)$$

where $1 \le k \le N_{nr}$, $N_{nr}$ represents a number of generators not providing frequency regulation capacities in the $t^{th}$ control period, $F_{k,t}^r$ represents a first fee paid by a $k^{th}$ generator of the generators not providing frequency regulation capacities in the $t^{th}$ control period, $P_{k,t}^w$ represents an active power of the $k^{th}$ generator of the generators not providing frequency regulation capacities in the $t^{th}$ control period, $D_t$ represents a sum of active powers of the generators not providing frequency regulation capacities in the $t^{th}$ control period;

obtaining compensation for the generators providing frequency regulation capacities in the $t^{th}$ control period according to formula (4), $$J_{j,t}^r = R_{j,t}^r C_{m,t}^r \quad (4)$$

where $1 \le j \le N_r$, $J_{j,t}^r$ represents compensation for the $j^{th}$ generator of the generators providing frequency regulation capacities in the $t^{th}$ control period.

4. The optimal control method according to claim 1, further comprising:
   determining a second unit marginal price of spinning reserve capacities in the $t^{th}$ control period, wherein the second unit marginal price is a maximal value in second prices of spinning reserve capacities provided by the generators in the $t^{th}$ control period;
   obtaining a second sum of prices of generators providing spinning reserve capacities in the $t^{th}$ control period according to formula (5), $$C_t^s = \sum_{j_1=1}^{N_s} R_{j_1,t}^s C_{m,t}^s, t = 1, 2, \ldots, T \quad (5)$$

where $C_t^s$ represents the second sum of prices, $N_s$ represents a number of generators providing spinning reserve capacities in the $t^{th}$ control period, $R_{j_1,t}^s$ represents a spinning reserve capacity provided by a $j_1^{th}$ generator of the generators providing spinning reserve capacities in the $t^{th}$ control period, $C_{m,t}^s$ represents the second unit marginal price of spinning reserve capacities in the $t^{th}$ control period;
   obtaining second fees paid by generators not providing spinning reserve capacities in the $t^{th}$ control period according to formula (6), $$F_{k_1,t}^s = C_t^s \cdot \frac{P_{k_1,t}^w}{D_t} \quad (6)$$

where $1 \le k_1 \le N_{ns}$, $N_{ns}$ represents a number of generators not providing spinning reserve capacities in the $t^{th}$ control period, $F_{k_1,t}^s$ represents a second fee paid by a $k_1^{th}$ generator of the generators not providing spinning reserve capacities in the $t^{th}$ control period, $P_{k_1,t}^w$ represents an active power of the $k_1^{th}$ generator of the generators not providing spinning reserve capacities in the $t^{th}$ control period, $D_t$ represents a sum of active powers of the generators not providing spinning reserve capacities in the $t^{th}$ control period;
   obtaining compensation for the generators providing spinning reserve capacities in the $t^{th}$ control period according to formula (7), $$J_{j_1,t}^s = R_{j_1,t}^s C_{m,t}^s \quad (7)$$

where $1 \le j_1 \le N_s$, $J_{j_1,t}^s$ represents compensation for the $j_1^{th}$ generator of the generators providing spinning reserve capacities in the $t^{th}$ control period.

5. An optimal control apparatus for a power system, comprising: a processor;
   a memory configured to store an instruction executable by the processor; wherein the processor is configured to:
   obtain ancillary service bidding data of generators of a next control cycle, wherein the ancillary service bidding data comprises frequency regulation capacities in each control period of the next control cycle and first prices corresponding to the frequency regulation capacities, and spinning reserve capacities in each control period of the next control cycle and second prices corresponding to the spinning reserve capacities;

establish a power system optimal control model according to the frequency regulation capacities in each control period of the next control cycle and the first prices, and the spinning reserve capacities in each control period of the next control cycle and the second prices;

solve the power system optimal control model to obtain optimal frequency regulation capacities in each control period of the next control cycle and optimal spinning reserve capacities in each control period of the next control cycle;

adjusting active power output of each generator based on the optimal frequency regulation capacities in each control period of the next control cycle and the optimal spinning reserve capacities in each control period of the next control cycle, wherein the power system optimal control model is denoted according to formula (1), $$\min \sum_{i=1}^{N} \sum_{t=1}^{T} (C_{i,t}^r R_{i,t}^r + C_{i,t}^s R_{i,t}^s) \qquad (1)$$

s.t.

$$R_t^{r,min} \leq \sum_{i=1}^{N} R_{i,t}^r, \, t = 1, 2, \ldots, T$$

$$R_t^{s,min} \leq \sum_{i=1}^{N} R_{i,t}^s, \, t = 1, 2, \ldots, T$$

$$R_{i,t}^r + R_{i,t}^s + P_{i,t} \leq P_{i,max}, \, i = 1, 2, \ldots, N; \, t = 1, 2, \ldots, T$$

where N represents a number of the generators, T represents a number of control periods in the next control cycle, $R_{i,t}^r$ represents a frequency regulation capacity provided by a $i^{th}$ generator in a $t^{th}$ control period, $C_{i,t}^r$ represents a first price of the frequency regulation capacity provided by the $i^{th}$ generator in the $t^{th}$ control period, $R_{i,t}^s$ represents a spinning reserve capacity provided by the $i^{th}$ generator in the $t^{th}$ control period, $C_{i,t}^s$ represents a second price of the spinning reserve capacity provided by the $i^{th}$ generator in the $t^{th}$ control period, $R_t^{r,min}$ represents a lower limit of a required frequency regulation capacity in the power system in the $t^{th}$ control period, $R_t^{s,min}$ represents a lower limit of a required spinning reserve capacity in the power system in the $t^{th}$ control period, $P_{i,t}$ represents an active power of the $i^{th}$ generator in the $t^{th}$ control period, $P_{i,max}$ represents a maximum active power of the $i^{th}$ generator in the $t^{th}$ control period.

6. The optimal control apparatus according to claim 5, wherein the next control cycle is one day.

7. The optimal control apparatus according to claim 5, wherein the processor is further configured to:
determine a first unit marginal price of frequency regulation capacities in the $t^{th}$ control period, wherein the first unit marginal price is a maximal value in first prices of frequency regulation capacities provided by the generators in the $t^{th}$ control period;
obtain a first sum of prices of generators providing frequency regulation capacities in the $t^{th}$ control period according to formula (2), $$C_t^r = \sum_{j=1}^{N_r} R_{j,t}^r C_{m,t}^r, \, t = 1, 2, \ldots, T \qquad (2)$$

where $C_t^r$ represents the first sum of prices, $N_r$ represents a number of generators providing frequency regulation capacities in the $t^{th}$ control period, $R_{j,t}^r$ represents a frequency regulation capacity provided by a $j^{th}$ generator of the generators providing frequency regulation capacities in the $t^{th}$ control period, $C_{m,t}^r$ represents the first unit marginal price of frequency regulation capacities in the $t^{th}$ control period;
obtain first fees paid by generators not providing frequency regulation capacities in the $t^{th}$ control period according to formula (3), $$F_{k,t}^r = C_t^r \cdot \frac{P_{k,t}^w}{D_t} \qquad (3)$$

where $1 \leq k \leq N_{nr}$, $N_{nr}$ represents a number of generators not providing frequency regulation capacities in the $t^{th}$ control period, $F_{k,t}^r$ represents a first fee paid by a $k^{th}$ generator of the generators not providing frequency regulation capacities in the $t^{th}$ control period, $P_{k,t}^w$ represents an active power of the $k^{th}$ generator of the generators not providing frequency regulation capacities in the $t^{th}$ control period, $D_t$ represents a sum of active powers of the generators not providing frequency regulation capacities in the $t^{th}$ control period;
obtain compensation for the generators providing frequency regulation capacities in the $t^{th}$ control period according to formula (4), $$J_{j,t}^r = R_{j,t}^r C_{m,t}^r \qquad (4)$$

where $1 \leq j \leq N_r$, $J_{j,t}^r$ represents compensation for the $j^{th}$ generator of the generators providing frequency regulation capacities in the $t^{th}$ control period.

8. The optimal control apparatus according to claim 5, wherein the processor is further configured to:
determine a second unit marginal price of spinning reserve capacities in the $t^{th}$ control period, wherein the second unit marginal price is a maximal value in second prices of spinning reserve capacities provided by the generators in the $t^{th}$ control period;
obtain a second sum of prices of generators providing spinning reserve capacities in the $t^{th}$ control period according to formula (5), $$C_t^s = \sum_{j_1=1}^{N_s} R_{j_1,t}^s C_{m,t}^s, \, t = 1, 2, \ldots, T \qquad (5)$$

where $C_t^s$ represents the second sum of prices, $N_s$ represents a number of generators providing spinning reserve capacities in the $t^{th}$ control period, $R_{j_1,t}^s$ represents a spinning reserve capacity provided by a $j_1^{th}$ generator of the generators providing spinning reserve capacities in the $t^{th}$ control period, $C_{m,t}^s$ represents the second unit marginal price of spinning reserve capacities in the $t^{th}$ control period;
obtain second fees paid by generators not providing spinning reserve capacities in the $t^{th}$ control period according to formula (6), $$F_{k_1,t}^s = C_t^s \cdot \frac{P_{k_1,t}^w}{D_t} \qquad (6)$$

where $1 \leq k_1 \leq N_{ns}$, $N_{ns}$ represents a number of generators not providing spinning reserve capacities in the $t^{th}$ control period, $F_{k_1,t}^s$ represents a second fee paid by a $k_1^{th}$ generator of the generators not providing spinning reserve capacities in the $t^{th}$ control period, $P_{k_1,t}^w$ represents an active power of the $k_1^{th}$ generator of the generators not providing spinning reserve capacities in the $t^{th}$ control period, $D_t$ represents a sum of active powers of the generators not providing spinning reserve capacities in the $t^{th}$ control period;

obtain compensation for the generators providing spinning reserve capacities in the $t^{th}$ control period according to formula (7), $$J_{j_1,t}^s = R_{j_1,t}^s C_{m,t}^s \quad (7)$$

where $1 \leq j_1 \leq N_s$, $J_{j_1,t}^s$ represents compensation for the $j_1^{th}$ generator of the generators providing spinning reserve capacities in the $t^{th}$ control period.

9. A non-transitory computer-readable storage medium having stored therein instructions that, when executed by a processor of a terminal, causes the terminal to perform an optimal control method for a power system for running an application program, the method comprising:

obtaining ancillary service bidding data of generators of a next control cycle, wherein the ancillary service bidding data comprises frequency regulation capacities in each control period of the next control cycle and first prices corresponding to the frequency regulation capacities, and spinning reserve capacities in each control period of the next control cycle and second prices corresponding to the spinning reserve capacities;

establishing a power system optimal control model according to the frequency regulation capacities in each control period of the next control cycle and the first prices, and the spinning reserve capacities in each control period of the next control cycle and the second prices;

solving the power system optimal control model to obtain optimal frequency regulation capacities in each control period of the next control cycle and optimal spinning reserve capacities in each control period of the next control cycle;

adjusting active power output of each generator based on the optimal frequency regulation capacities in each control period of the next control cycle and the optimal spinning reserve capacities in each control period of the next control cycle, wherein the power system optimal control model is denoted according to formula (1), $$\min \sum_{i=1}^{N} \sum_{t=1}^{T} (C_{i,t}^r R_{i,t}^r + C_{i,t}^s R_{i,t}^s) \quad (1)$$

s.t.

$$R_t^{r,min} \leq \sum_{i=1}^{N} R_{i,t}^r, t = 1, 2, \ldots, T$$

$$R_t^{s,min} \leq \sum_{i=1}^{N} R_{i,t}^s, t = 1, 2, \ldots, T$$

$$R_{i,t}^r + R_{i,t}^s + P_{i,t} \leq P_{i,max}, i = 1, 2, \ldots, N; t = 1, 2, \ldots, T$$

where N represents a number of the generators, T represents a number of control periods in the next control cycle, $R_{i,t}^r$ represents a frequency regulation capacity provided by a $i^{th}$ generator in a $t^{th}$ control period, $C_{i,t}^r$ represents a first price of the frequency regulation capacity provided by the $i^{th}$ generator in the $t^{th}$ control period, $R_{i,t}^s$ represents a spinning reserve capacity provided by the $i^{th}$ generator in the $t^{th}$ control period, $C_{i,t}^s$ represents a second price of the spinning reserve capacity provided by the $i^{th}$ generator in the $t^{th}$ control period, $R_t^{r,min}$ represents a lower limit of a required frequency regulation capacity in the power system in the $t^{th}$ control period, $R_t^{s,min}$ represents a lower limit of a required spinning reserve capacity in the power system in the $t^{th}$ control period, $P_{i,t}$ represents an active power of the $i^{th}$ generator in the $t^{th}$ control period, $P_{i,max}$ represents a maximum active power of the $i^{th}$ generator in the $t^{th}$ control period.

10. The non-transitory computer-readable storage medium according to claim 9, wherein the next control cycle is one day.

11. The non-transitory computer-readable storage medium according to claim 9, wherein the method further comprises steps of:

determining a first unit marginal price of frequency regulation capacities in the $t^{th}$ control period, wherein the first unit marginal price is a maximal value in first prices of frequency regulation capacities provided by the generators in the $t^{th}$ control period;

obtaining a first sum of prices of generators providing frequency regulation capacities in the $t^{th}$ control period according to formula (2), $$C_t^r = \sum_{j=1}^{N_r} R_{j,t}^r C_{m,t}^r, t = 1, 2, \ldots, T \quad (2)$$

where $C_t^r$ represents the first sum of prices, $N_r$ represents a number of generators providing frequency regulation capacities in the $t^{th}$ control period, $R_{j,t}^r$ represents a frequency regulation capacity provided by a $j^{th}$ generator of the generators providing frequency regulation capacities in the $t^{th}$ control period, $C_{m,t}^r$ represents the first unit marginal price of frequency regulation capacities in the $t^{th}$ control period;

obtaining first fees paid by generators not providing frequency regulation capacities in the $t^{th}$ control period according to formula (3), $$F_{k,t}^r = C_t^r \cdot \frac{P_{k,t}^w}{D_t} \quad (3)$$

where $1 \leq k \leq N_{nr}$, $N_{nr}$ represents a number of generators not providing frequency regulation capacities in the $t^{th}$ control period, $F_{k,t}^r$ represents a first fee paid by a $k^{th}$ generator of the generators not providing frequency regulation capacities in the $t^{th}$ control period, $P_{k,t}^w$ represents an active power of the $k^{th}$ generator of the generators not providing frequency regulation capacities in the $t^{th}$ control period, $D_t$ represents a sum of active powers of the generators not providing frequency regulation capacities in the $t^{th}$ control period;

obtaining compensation for the generators providing frequency regulation capacities in the $t^{th}$ control period according to formula (4), $$J_{j,t}^r = R_{j,t}^r C_{m,t}^r \quad (4)$$

where $1 \leq j \leq N_r$, $J_{j,t}^r$ represents compensation for the $j^{th}$ generator of the generators providing frequency regulation capacities in the $t^{th}$ control period.

12. The non-transitory computer-readable storage medium according to claim 9, wherein the method further comprises steps of:

determining a second unit marginal price of spinning reserve capacities in the $t^{th}$ control period, wherein the second unit marginal price is a maximal value in second prices of spinning reserve capacities provided by the generators in the $t^{th}$ control period;

obtaining a second sum of prices of generators providing spinning reserve capacities in the $t^{th}$ control period according to formula (5), $$C_t^s = \sum_{j_1=1}^{N_s} R_{j_1,t}^s C_{m,t}^s, t = 1, 2, \ldots, T \quad (5)$$

where $C_t^s$ represents the second sum of prices, $N_s$ represents a number of generators providing spinning reserve capacities in the $t^{th}$ control period, $R_{j_1,t}^s$ represents a spinning reserve capacity provided by a $j_1^{th}$ generator of the generators providing spinning reserve capacities in the $t^{th}$ control period, $C_{m,t}^s$ represents the second unit marginal price of spinning reserve capacities in the $t^{th}$ control period;

obtaining second fees paid by generators not providing spinning reserve capacities in the $t^{th}$ control period according to formula (6), $$F_{k_1,t}^s = C_t^s \cdot \frac{P_{k_1,t}^w}{D_t} \quad (6)$$

where $1 \leq k_1 \leq N_{ns}$, $N_{ns}$ represents a number of generators not providing spinning reserve capacities in the $t^{th}$ control period, $F_{k_1,t}^s$ represents a second fee paid by a $k_1^{th}$ generator of the generators not providing spinning reserve capacities in the $t^{th}$ control period, $P_{k_1,t}^q$ represents an active power of the $k_1^{th}$ generator of the generators not providing spinning reserve capacities in the $t^{th}$ control period, $D_t$ represents a sum of active powers of the generators not providing spinning reserve capacities in the $t^{th}$ control period;

obtaining compensation for the generators providing spinning reserve capacities in the $t^{th}$ control period according to formula (7), $$J_{j_1,t}^s = R_{j_1,t}^s C_{m,t}^s \quad (7)$$

where $1 \leq j_1 \leq N_s$, $J_{j_1,t}^s$ represents compensation for the $j_1^{th}$ generator of the generators providing spinning reserve capacities in the $t^{th}$ control period.

* * * * *